United States Patent
Sinha

(10) Patent No.: US 9,064,223 B2
(45) Date of Patent: Jun. 23, 2015

(54) METHOD AND SYSTEM FOR REAL-TIME VIEW OF SOFTWARE PRODUCT QUALITY

(75) Inventor: Akshay Sinha, Bangalore (IN)

(73) Assignee: SAP SE, Walldorf (DE)

( * ) Notice: Subject to any disclaimer, the term of this patent is extended or adjusted under 35 U.S.C. 154(b) by 454 days.

(21) Appl. No.: 13/336,436

(22) Filed: Dec. 23, 2011

(65) Prior Publication Data
US 2013/0167106 A1 Jun. 27, 2013

(51) Int. Cl.
*G06F 9/44* (2006.01)
*G06Q 10/06* (2012.01)

(52) U.S. Cl.
CPC ............ *G06Q 10/06395* (2013.01); *G06F 8/10* (2013.01); *G06F 8/77* (2013.01)

(58) Field of Classification Search
USPC .................. 717/101; 705/7, 7.27, 8; 700/109; 707/101
IPC ......... G06Q 10/06395; G06F 11/3409,11/3616, G06F 11/3447
See application file for complete search history.

(56) References Cited

U.S. PATENT DOCUMENTS

| | | | |
|---|---|---|---|
| 6,535,775 B1* | 3/2003 | Bagepalli et al. | 700/109 |
| 2004/0107125 A1* | 6/2004 | Guheen et al. | 705/7 |
| 2009/0254399 A1* | 10/2009 | Cristol | 705/8 |
| 2011/0055799 A1* | 3/2011 | Kaulgud et al. | 717/101 |

OTHER PUBLICATIONS

ASU, HSC, TTU, TTUS, IT Project Management Practices Guide: Aug. 15, 2011, pp. 1-83 <pmguide_081511.pdf>.*
Ravit, "Project Risks and Feasibility Assessement" < www.rpi.edu/~ ravit/sad/feasible_ppt> Sep. 17, 2011, p. 1-24 <feasible_091711. pdf>.*

* cited by examiner

*Primary Examiner* — Tuan Vu
(74) *Attorney, Agent, or Firm* — Buckley, Maschoff & Talwalkar LLC

(57) ABSTRACT

A system and method, the method including determining a quality score for at least one feature of a product, the quality score being a function of a priority of the at least one feature to the product, a relationship between the at least one feature and at least one design element comprising the at least one feature, and a complexity of the at least one design element; determining an overall quality score for the product based on a summation of each determined quality score for each of the at least one feature; and producing a report including the overall quality score for the product.

12 Claims, 6 Drawing Sheets

200

DETERMINE A QUALITY SCORE FOR AT LEAST ONE FEATURE OF A PRODUCT, THE QUALITY SCORE BEING A FUNCTION OF, AT LEAST, A PRIORITY OF THE AT LEAST ONE FEATURE, A RELATIONSHIP BETWEEN THE AT LEAST ONE FEATURE AND AT LEAST ONE DESIGN ELEMENT, AND A COMPLEXITY OF THE AT LEAST ONE DESIGN ELEMENT

205

↓

DETERMINE AN OVERALL QUALITY SCORE FOR THE PRODUCT BASED ON A SUMMATION OF EACH DETERMINED QUALITY SCORE FOR EACH OF THE AT LEAST ONE FEATURE

210

↓

PRODUCE A REPORT INCLUDING THE OVERALL QUALITY SCORE FOR THE PRODUCT

```
┌─────────────────────────────────────────────────────────────────┐
│                                                                 │
│   OBTAIN SPECIFICATION(S) FOR PRODUCT FEATURES AND DESIGN       │
│            ELEMENTS RELATED TO PRODUCT QUALITY                  │
│                                                            305  │
└─────────────────────────────────────────────────────────────────┘
                                 │
                                 ▼
┌─────────────────────────────────────────────────────────────────┐
│                                                                 │
│     UPDATE VALUES ASSOCIATED WITH A QUALITY SCORE OF THE        │
│     PRODUCT THROUGHOUT THE DEVELOPMENT OF THE PRODUCT           │
│                                                            310  │
└─────────────────────────────────────────────────────────────────┘
                                 │
                                 ▼
┌─────────────────────────────────────────────────────────────────┐
│                                                                 │
│        AUTOMATICALLY PRODUCE A QUALITY SCORE FOR THE PRODUCT    │
│                                                            315  │
└─────────────────────────────────────────────────────────────────┘
```

*FIG. 3*

METHOD AND SYSTEM FOR REAL-TIME VIEW OF SOFTWARE PRODUCT QUALITY

FIELD

Some embodiments relate to product quality. More specifically, some embodiments relate to the quality of a software product during the development of the product.

BACKGROUND

Software development organizations constantly strive to reduce the time to market for their software products. In order to achieve this objective, there is a need to closely monitor the quality of the software being developed to ensure that the product meets its intended design requirements. Software product quality is also the primary concern of Managers & Product Owners during development. Traditionally, a primary indicator used to indicate the quality of a software product during development of the product is the number of open issues related to the product. The terms "open issues" or "error messages" will be used herein to encompass all types of error messages and other types of indications that a feature related to a software product does not meet the design specifications of the software product.

A method of determining and reporting software product quality based primarily on the number of open issues is however insufficient since it may not accurately reflect the quality of the product being developed. For example, a relative high number of error messages does not necessarily imply poor or bad quality. In some instances each of the open issues (messages) could be fairly isolated, simple to solve, or may correspond to less critical scenarios associated with the product, thereby not truly representing a major impact to the quality of the software product. Likewise, a relatively low number of error messages does not necessarily imply high or good quality. In some aspects, each of the open issues may correspond to very complex scenarios or be highly coupled and difficult to solve. As such, the relatively few open issues may truly represent a low quality for the software product.

BRIEF DESCRIPTION OF THE DRAWINGS

FIG. 2 is a flow diagram of a process, according to some embodiments.

FIG. 3 is a flow diagram of a process, according to some embodiments.

DETAILED DESCRIPTION

As noted above, some conventional methods and approaches for detecting and/or reporting the quality of a product being developed (e.g., a software product) use and rely on the number of open issues related to the product being developed as the primary indicator or determinant in determining the quality of the product. However, the applicant hereof has realized that the number of open issues alone is not sufficient to determine the quality of a product. In some aspects, the complexity of the open issues may impact the quality of the product and should be accounted for. In this regard, the complexity of an issue may be a function of the complexity of the underlying design elements influencing the feature(s) of the software product. Accordingly, Complexity of an issue=$f$(Complexity of design elements influencing the feature)

In some aspects, the complexity of a design element may be a function of a number of factors, including the perception of an architect or other entity developing the software product and a complexity of linked design elements that also influence the software product. Stated another way, Complexity of a design element=$f$(Perception of architect, Complexity of linked design elements)

In some aspects and embodiments herein, factors other than those listed above may also influence the quality of a product being developed. Thus, in some embodiments one or more other factors, such as but not limited to implementation & testing statuses of features, priority of features, and severity of issues may also be considered in a determining and reporting of the quality of a software product.

Figure 1:
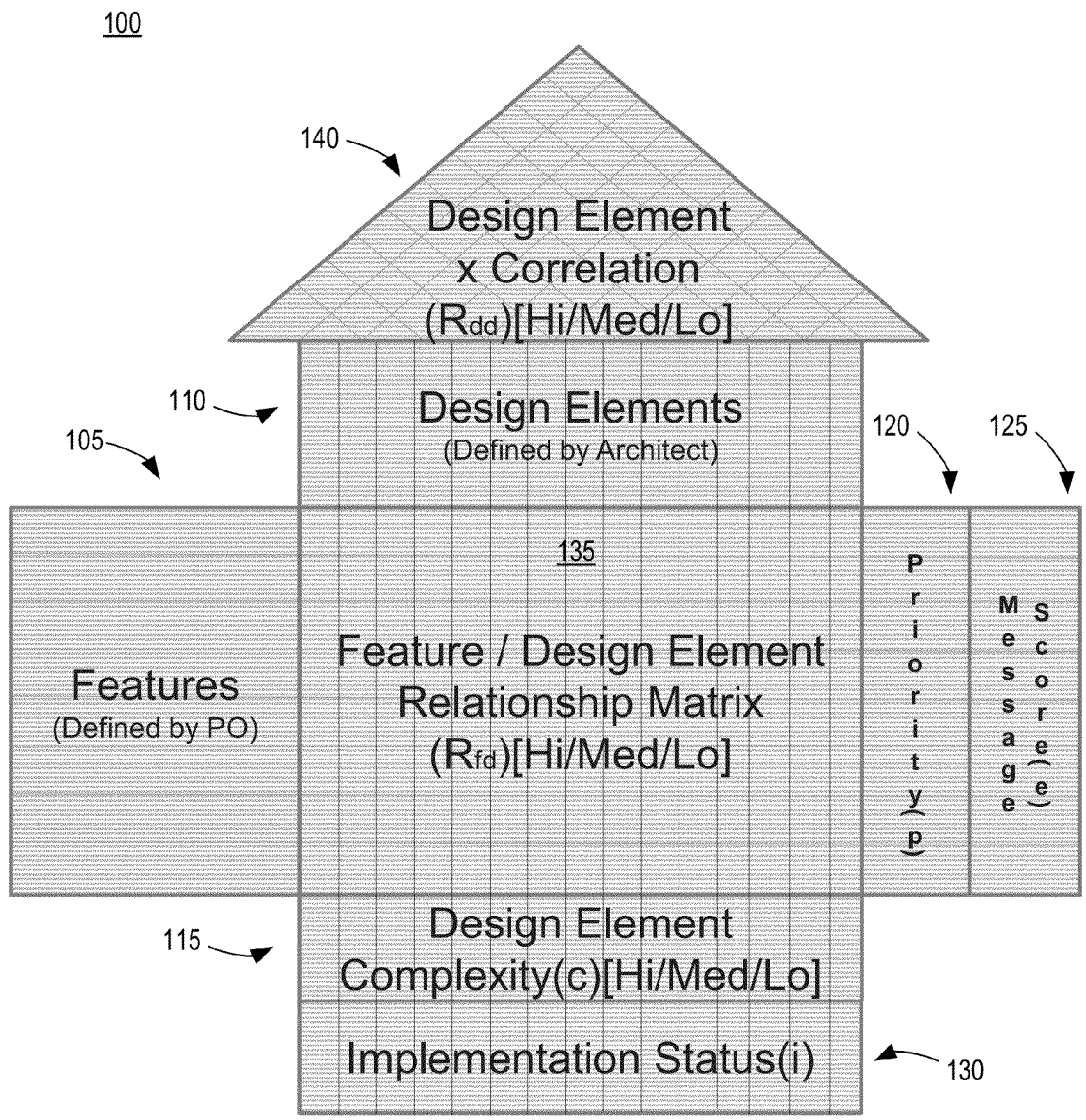
FIG. 1 is an illustrative representation of various aspects related to product quality, according to some embodiments herein.

FIG. 1 is an illustrative representation of various factors related to product quality, according to some embodiments herein. In this case, the various interrelated factors influencing the quality of a product in a software development context are shown in a "house of quality" 100. "House" 100 includes and considers the features 105 desired by a product owner (PO). In some aspects, these features 105 may be the customer requirements for the product. Also included and considered are the design elements 110, which may be specified or defined by the architect (or other entity) responsible for the architecture) of the software product. "House" 100 also includes design element complexity at 115. The design element complexity factor may be based on a perception of the architect and a complexity of the linked design elements. At 120 a priority parameter (p) that accounts for the importance of a feature of the product as defined by the Product Owner, a message score (e) is included and considered at 125, and an implementation status representative of whether a design element is implemented or not is included in "house" 100 at 130. Further, a feature/design element relationship matrix parameter ($R_{fd}$) is shown at 135 and a design element cross-correlation factor ($R_{dd}$) is depicted in FIG. 1 at 140.

FIG. 1 includes the factors that may be considered in determining a quality of a product in a software environment. In reliance on the factors depicted in FIG. 1, some embodiments herein provide mathematical models and relationships (e.g., equations) that facilitate a mechanism to provide a real-time view on a quality of a software product.

In some embodiments, a quality score Q for a product may be computed as:

$$Q = \Sigma Q_x,$$

where Q is the overall quality score and $Q_x$ is the quality score for all x, where x is a single feature. That is, the overall quality score for a product is the sum of the quality score of each feature x comprising the product.

In accord with some aspects herein, the quality score of each feature x, $Q_x$, may be computed as:

$$Q_x = p_x * e_x \Sigma (R_{fx\,dk} * i_k * c) \text{ for all } k,$$

where k is a design element related to feature x, $p_x$ is a priority of feature x as defined by the product owner, $e_x$ is an error message score value for the feature x, $R_{fx\,dk}$ is a feature/design relationship matrix value that indicates how strongly a design element k influences a feature x, $i_k$ is an implementation status of a design element k, and c is a complexity value for a design element k.

In some embodiments, the implementation status, $i_k$, is:
0, when design element k has not been implemented; and
1, when design element k has been implemented.
In some embodiments, the error message score, $e_x$, is:
0, when feature x has not been tested;
1, when feature x has been tested and has no open messages; and $$\frac{1}{\sum (n_s * s)},$$

when n messages exist with severity s, where $n_s$ is a number of messages on feature x, of severity s.

In some aspects, the complexity parameter c may be calculated based on the equation:

$$c = c_k + \Sigma(R_{dk\ dj} * c_j), \text{ for all } j,$$

where j is a design element correlated with k.

Some embodiments herein provide methods and systems for determining a quality score (e.g., Q) for a software product based on the equations and relationships introduced above. FIG. 2 is a flow diagram of a process 200 that may determine and report a quality score of a product, in accordance with some embodiments herein.

At operation 205 of process 200, a quality score for at least one feature of a product ($Q_x$) is determined. The quality score ($Q_x$) for one feature may be a function of the priority of the feature ($p_x$), its message score ($e_x$), and a summation of the effects of feature-design relationship values ($R_{fx\ dk}$), implementation statuses of design elements influencing the feature and the corresponding complexities (c). The equations introduced hereinabove may be used to calculate values for the various parameters in operation 205.

At operation 210, an overall quality score for the product being developed and monitored for quality control and maintenance purposes may be determined. The overall quality score may be based on a summation of the quality score for each of the features of the product, as determined at operation 205.

Operation 215 includes a functionality to produce a report including the overall quality score. The report may be produced and stored in an electronic file, memory, database, or other data structure. In some aspects, the report may include a presentation of information that may be understood by a machine and/or a human, including text, graphics, audio, animation, and other forms of media.

In some embodiments, the "house of quality" disclosed herein may be implemented, at least in some aspects, by or in an automated tool, service, or application. FIG. 3 is an illustrative depiction of a flow diagram for a process 300 that may be used by such an automated tool, service, or application. At operation 305, one or more specifications for product features and design elements related to product quality may be obtained. In some aspects, the product features and design elements may be obtained at an initial stage or a delta configuration of a product development cycle. In some embodiments, the product features and design element specification(s) may be obtained from a database, electronic file, other data structure, another process, or directly from a human.

Operation 305 may include, for example, a product owner (PO) listing product features or requirements at 105 of "house" 100 in FIG. 1, the PO entering a priority of each feature at 120, an architect (or other entity) listing design elements at 110, the architect entering the complexity of each design element at 115, and the architect providing a value for the feature/design relationship matrix at 135 and the design cross-correlation matrix at 140.

At operation 310, values associated with a quality score of the product may be periodically updated. The values may be updated at operation 310 throughout the development of the product as the values for certain parameters related the quality of the product change. In some embodiments, activities associated with operation 310 may include, for example, a developer setting the implementation status for each design at 130 of FIG. 1 and a quality engineer providing an indication of each error message with an identifier of the corresponding feature. In some aspects, the activities of operation 310 may be performed on a periodic basis, whether on a fixed or dynamic schedule.

In some embodiments, the automated tool, service, or application implementing aspects of the present disclosure may read, obtain, or otherwise determine a test-case testing status and error message information for each feature identifier and calculate a message score for each feature identifier. In some aspects, operation 315 may provide the requisite information for the production of a report or other presentation of quality score data. In some embodiments, the report may be presented in a number of different formats and configurations, including a time-variant graph and user interfaces such as a dashboard.

In some embodiments, an implementation herein may calculate a quality score for a product and display it to the user as a time-variant graph. In some aspects, a target quality score may be calculated at a start of a product development cycle by substituting appropriate values in the formula(s) for quality score. Thereafter, the software product development team (and/or other entities) may work to achieve the established, mathematically defined fixed target quality score.

Figure 4:
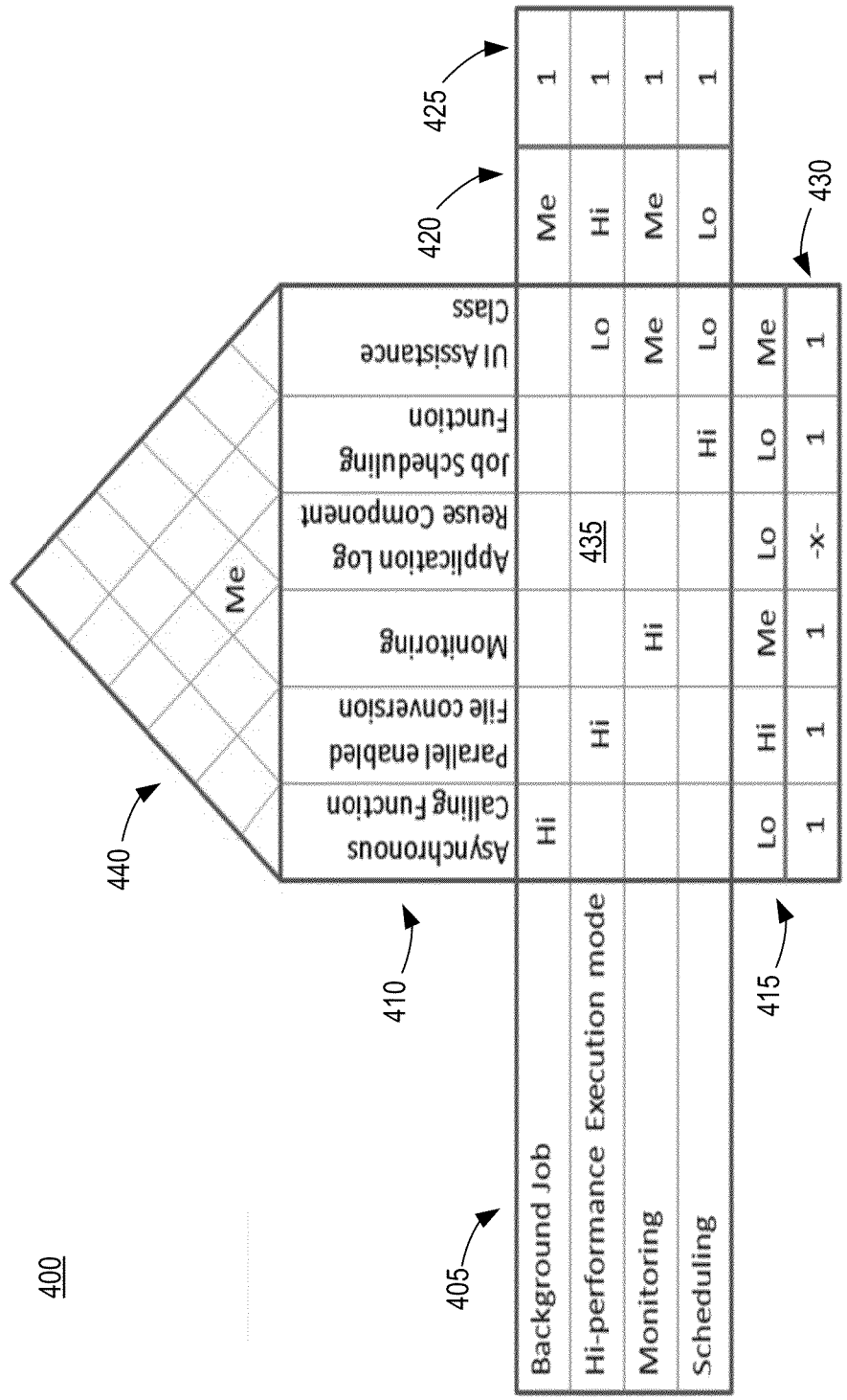
FIG. 4 is a view of an illustrative example of the various aspects related to the product quality of an example software product, according to some embodiments.

An example use case will now be presented to further illustrate various aspects of the present disclosure. FIG. 4 is a depiction of a "house of quality" 400, including parameters for an example software product, and the values corresponding to those parameters. The example of FIG. 4 relates to a "File Converter" software product being developed that includes functionality for the mass conversion of files from one format to another format. Regarding the population of "house" 400, a number or set of customer requirements may be provided at 405, with the corresponding priorities provided at 420. The customer requirements may require the application to run as a background job, because mass file conversion may be a lengthy time consuming operation (Medium Priority); include a "high performance" execution mode that uses higher system resources (High Priority); allow the user to monitor a running conversion (e.g., File conversion statuses; Logs; etc.) (Medium Priority); and support the scheduling of nightly runs (Lo Priority).

Further regarding the population of "house" 400, a number of design characteristics may be specified by an architect to implement the given customer requirements. The design characteristics are depicted in FIG. 4 at 410, with the corresponding complexities provided at 415. The design characteristics may include an asynchronous calling function to start the converter as a background job (Low Complexity); parallel-processing for a "high performance" execution mode (High Complexity; a monitoring module, that makes use of an application log reuse component (Medium Complexity) where the application log is an existing component that should be reused by monitoring module. The application log is thus correlated to the monitoring module and contributes to the complexity of the monitoring module, but does not have an implementation status or feature-design relationship weight in the "house" 400; a job scheduling function (Low complexity); and a user interface (UI) Assistance class (Medium complexity).

In the example of FIG. 4, the complexity 415, the priority 420, the feature/design relationship matrix 435, and the design element correlation 440 factors may each be high ("Hi"), medium ("Me"), or low ("Lo"). In this example "Hi" has a value of 4, "Me" has a value of 2, and the "Lo" value is equal to 1.

Using the mathematical equations provided above, a Target Quality Score may be calculated by setting the implementation status equal to 1 for all design elements at 430 and by setting the message score equal to 1 for all of the customer requirements at 425. Based on FIG. 4, the calculations include:

$$Q1=2*1*(4*1*1)=8$$

$$Q2=4*1*[(4*1*4)+(1*1*2)]=72$$

$$Q3 = 2*1*[(4*1*c)+(2*1*2)]$$
$$= 2*1*[\{4*1*2(2+2*1)\}+(2*1*2)] = 40$$

$$Q4=1*1*[(4*1*1)+(1*1*2)]=6$$

Accordingly, the Target Quality Score Q=8+72+40+6=126

The above calculations demonstrate that the parallel processing and the scheduling functions have the greatest and the least impact, respectively, on the quality score. This result is as expected from priorities and complexities assigned to the respective requirements.

Continuing with the use case example, one issue having a "High" severity and one issue having a "Low" severity are discovered while testing the monitoring feature. As such, calculating and substituting the message score in Q3 yields:

$$e3=1/[(1*4)+(1*1)]=1/5$$

$$Q3 = 2*(1/5)*[(4*1*c)+(2*1*2)]$$
$$= 2*(1/5)*[\{4*1*2(2+2*1)\}+(2*1*2)] = 8$$

Therefore, the Quality Score decreases to:

$$Q=8+72+8+6=94$$

Such a significant drop in the Quality Score may be an immediate indication that something substantial is wrong in a critical piece of the software implementation. In this manner it is seen that the methods herein may provide and efficient and effective quality tracking tool regarding the development of the software product.

Figure 5:
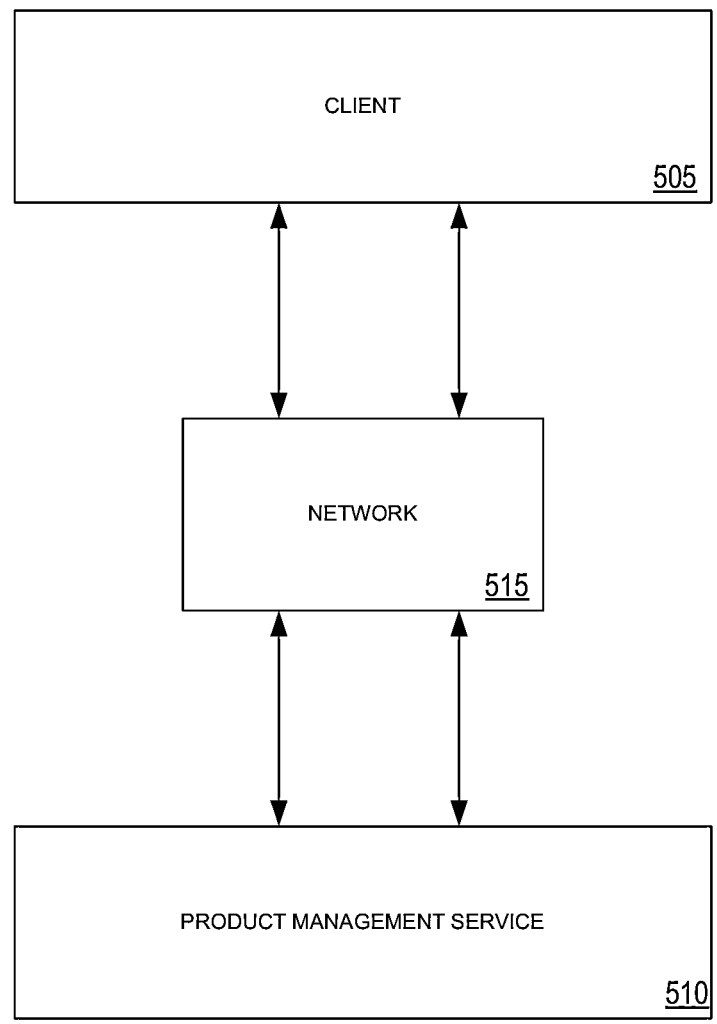
FIG. 5 is a block diagram of a system, according to some embodiments.

FIG. 5 is a block diagram of a system 500 according to some embodiments. In this case, a product management service 510 might host and provide business services for a client 505. For example, product management service 510 may receive requests from the client 505 and provide responses to the client 505 via a service-oriented architecture via a network 515. Note that the product management service 510 might represent any backend system, including backend systems that belong to the client 505, those that belong to (or are administered by) service providers, those that are web services, etc.

Client 505 may be associated with a Web browser to access services provided by business process platform via HyperText Transport Protocol (HTTP) communication. Client 505, in response, may transmit a corresponding HTTP service request to the product management service 510 as illustrated. A service-oriented architecture may conduct any processing required by the request (e.g., generating queries related to determining a quality score status in real-time and executing the queries against a collection of product data) and, after completing the processing, provides a response (e.g., quality score results) to client 505. Client 505 may comprise a Personal Computer (PC) or mobile device executing a Web client. Examples of a Web client include, but are not limited to, a Web browser, an execution engine (e.g., JAVA, Flash, Silverlight) to execute associated code in a Web browser, and/or a dedicated standalone application.

In some aspects, FIG. 5 represents a logical architecture for describing processes according to some embodiments, and actual implementations may include more or different elements arranged in other manners. Moreover, each system described herein may be implemented by any number of devices in communication via any number of other public and/or private networks. Two or more of the devices herein may be co-located, may be a single device, or may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, magnetic tape, and solid state Random Access Memory (RAM) or Read Only Memory (ROM) storage units. According to some embodiments, a memory storage unit may be associated with access patterns and may be independent from the device (e.g., magnetic, optoelectronic, semiconductor/solid-state, etc.) Moreover, in-memory technologies may be used such that databases, etc. may be completely operated in RAM memory at a processor. Embodiments are therefore not limited to any specific combination of hardware and software.

Accordingly, a method and mechanism for efficiently and automatically creating and executing a query based on a selection of data items selected via a user interface are provided by some embodiments herein.

Figure 6:
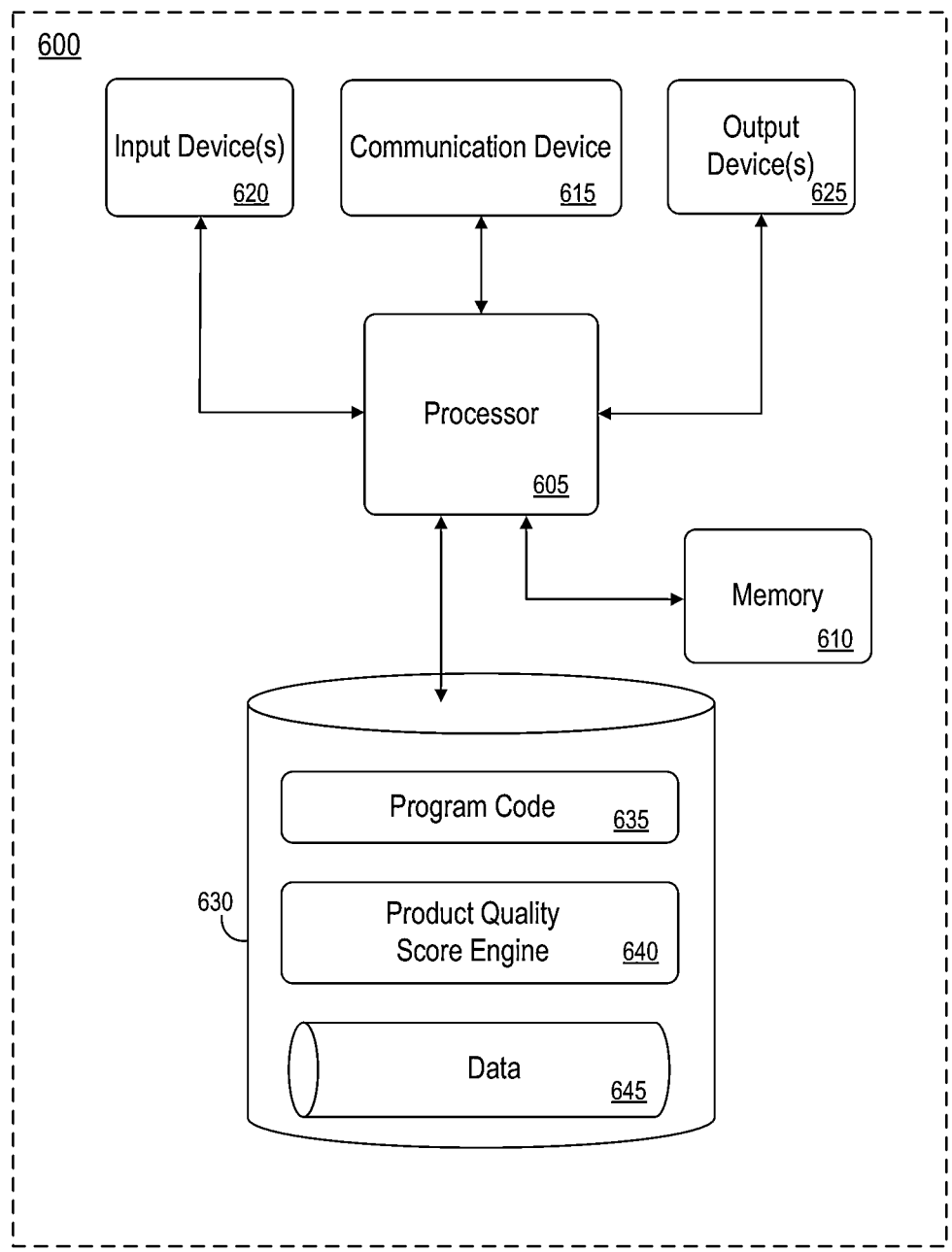
FIG. 6 is a block diagram of an apparatus, according to some embodiments.

FIG. 6 is a block diagram overview of a system or apparatus 600 according to some embodiments. System 600 may be, for example, associated with any device to implement the methods and processes described herein, including for example client devices and a server of a business service provider that provisions software products. System 600 comprises a processor 605, such as one or more commercially available Central Processing Units (CPUs) in the form of one-chip microprocessors or a multi-core processor, coupled to a communication device 615 configured to communicate via a communication network (not shown in FIG. 6) to another device or system. In the instance system 600 comprises an application server, communication device 615 may provide a means for system 600 to interface with a client device. System 600 may also include a local memory 610, such as RAM memory modules. The system 600 further includes an input device 620 (e.g., a touch screen, mouse and/or keyboard to enter content) and an output device 625 (e.g., a computer monitor to display a user interface element).

Processor 605 communicates with a storage device 630. Storage device 630 may comprise any appropriate information storage device, including combinations of magnetic storage devices (e.g., a hard disk drive), optical storage devices, and/or semiconductor memory devices. In some embodiments, storage device may comprise a database system.

Storage device 630 stores a program code 635 that may provide computer executable instructions for processing requests from, for example, client devices in accordance with processes herein. Processor 605 may perform the instructions of the program 635 to thereby operate in accordance with any of the embodiments described herein. Program code 635 may be stored in a compressed, uncompiled and/or encrypted format. Program code 635 may furthermore include other program elements, such as an operating system, a database management system, and/or device drivers used by the processor 605 to interface with, for example, peripheral devices. Storage device 630 may also include data 645. Data 645, in conjunction with product quality score engine 640, may be used by system 600, in some aspects, in performing the processes herein, such as processes 200 and 300.

All systems and processes discussed herein may be embodied in program code stored on one or more computer-readable media. Such media may include, for example, a floppy disk, a CD-ROM, a DVD-ROM, one or more types of "discs", magnetic tape, a memory card, a flash drive, a solid state drive, and solid state Random Access Memory (RAM) or Read Only Memory (ROM) storage units. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims

What is claimed is:

1. A computer-implemented method to determine an indicator of a quality of a software product during development of the software product, the method comprising:
   determining, by a computer, an overall quality score for a software product comprising at least one feature, the overall quality score being defined by a mathematical function of a priority of the at least one feature of the software product, a mathematical relationship between the at least one feature and at least one design element comprising the at least one feature of the software product, and a complexity of the at least one design element;
   wherein the overall quality score for the software product is determined by an equation $Q=\Sigma Q_x$, where Q is the overall quality score for the software product, $Q_x$ is a quality score for all features x of the software product, x is a single feature of the software product;
   the overall quality score for the software product is based on a summation of the determined quality score for all of the at least one features comprising the software product based on the equation $Q_x=p_x \cdot e_x \Sigma(R_{fx\ dk} \cdot i k \cdot c)$, for all k;
   where $Q_x$ is the multiplication product of $p_x$ times the multiplication product of $e_x$ times the summation of the multiplication product of $R_{fx\ dk}$ times $i_k$ times c;
   where k is a design element of feature x of the software product;
   $p_x$ is a priority parameter of feature x of the software product that is representative of an importance of the feature x of the software product, where $p_x$ is a real number;
   $e_x$ is an error message score value for the feature x that is a function of whether the feature x has been tested and a number and severity of error messages associated with the feature x;
   $R_{fx\ dk}$ is representative of a feature/design relationship matrix value relating a design element influence strength of the design element k to a feature x of the software product;
   $i_k$ is an implementation status indicator of the design element k indicative of whether design element k is implemented in the software product;
   c is a complexity value for a design element k for the software product;
   calculating, by the computer, a target quality score for the software product using the equation $Q=\Sigma Q\_x$, where the value for $e_x$ and $i_k$ is set to 1 for the determination of the target quality score for the software product; and
   producing, by the computer, a report including at least one of the overall quality score and the target quality score for the software product.

2. The method of claim 1, wherein the report comprises a time variant representation of the overall quality score for the software product relative to a period of time.

3. The method of claim 1, wherein $e_x$ is a value of:
   0, when feature x has not been tested;
   1, when feature x has been tested and has no open messages; and $$\frac{1}{\Sigma\ (n_s * s)},$$

when n messages exist with a non-zero severity ranking s, where $n_s$ is a number of messages corresponding to feature x, of severity ranking s, and a multiplication product of $n_s$ and s is summed.

4. The method of claim 1, wherein implementation status, is a value of:
   0, when design element k has not been implemented; and
   1, when design element k has been implemented.

5. The method of claim 1 wherein, e, the error message score value for the feature x; $R_{fx\ dk}$ the feature/design relationship matrix value for relating a strength of a design element k to a feature x; and c, the complexity value for the design element k each have an assigned value selected from at least two predetermined values.

6. The method of claim 1, wherein $c=c_k+\Sigma(R_{dk\ dj}*c_j)$, for all j, where j is a design element correlated with k, and $c_k$ is added to a summation of a multiplication product of $R_{dk\ dj}$ and $c_j$.

7. A system comprising:
   a memory having processor-executable instructions stored thereon; and
   a computer including a processor to execute the processor-executable instructions to cause the system to:
      determine, by the computer, an overall quality score a software product comprising at least one feature, the overall quality score being defined by a mathematical function of a priority of the at least one feature of the software product, a mathematical relationship between the at least one feature and at least one design element comprising the at least one feature of the software product, and a complexity of the at least one design element;
      wherein the overall quality score for the software product is determined by an equation $Q=\Sigma Q_x$, where Q is the overall quality score for the software product, $Q_x$ is a quality score for all features x of the software product, x is a single feature of the software product;

the overall quality score for the software product is based on a summation of the determined quality score for all of the at least one features comprising the software product based on the equation $Q_x = p_x \cdot e_x \Sigma(R_{fx\ dk} \cdot i_k \cdot c)$, for all k;

where $Q_x$ is the multiplication product of $p_x$ times the multiplication product of $e_x$ times the summation of the multiplication product of $R_{fx\ dk}$ times $i_k$ times c;

where k is a design element of feature x of the software product;

$p_x$ is a priority parameter of feature x of the software product that is representative of an importance of the feature x of the software product, where $p_x$ is a real number;

$e_x$ is an error message score value for the feature x that is a function of whether the feature x has been tested and a number and severity of error messages associated with the feature x;

$R_{fx\ dk}$ is representative of a feature/design relationship matrix value relating a design element influence strength of the design element k to a feature x of the software product;

$i_k$ is an implementation status indicator of the design element k indicative of whether design element k is implemented in the software product;

c is a complexity value for a design element k for the software product;

calculate, by the computer, a target quality score for the software product using the equation $Q = \Sigma Q\_x$, where the value for $e_x$ and $i_k$ is set to 1 for the determination of the target quality score for the software product; and produce, by the computer, a report including at least one of the overall quality score and the target quality score for the software product.

8. The system of claim 7, wherein the report comprises a time variant representation of the overall quality score for the software product relative to a period of time.

9. The system of claim 7, wherein $e_x$ is a value of:
   0, when feature x has not been tested;
   1, when feature x has been tested and has no open messages; and $$\frac{1}{\Sigma\ (n_s * s)},$$

when n messages exist with a non-zero severity ranking s, where $n_s$ is a number of messages corresponding to feature x, of severity ranking s, and a multiplication product of $n_s$ and s is summed.

10. The system of claim 7, wherein implementation status, is a value of:
   0, when design element k has not been implemented; and
   1, when design element k has been implemented.

11. The system of claim 7, wherein, $e_x$, the error message score value for the feature x; $R_{fx\ dk}$ the feature/design relationship matrix value for relating a strength of a design element k to a feature x; and c, the complexity value for the design element k each have an assigned value selected from at least two predetermined values.

12. The system of claim 7, wherein $c = c_k + \Sigma(R_{dk\ dj} * c_j)$, for all j, where j is a design element correlated with k, and $c_k$ is added to a summation of a multiplication product of $R_{dk\ dj}$ and $c_j$.

* * * * *